No. 705,152. Patented July 22, 1902.
H. W. SMITH, W. T. GIDDEN & A. G. SALAMON.
METHOD OF MAKING SULFOCYANIDS FROM COAL GAS.
(Application filed Dec. 30, 1901.)
(No Model.)
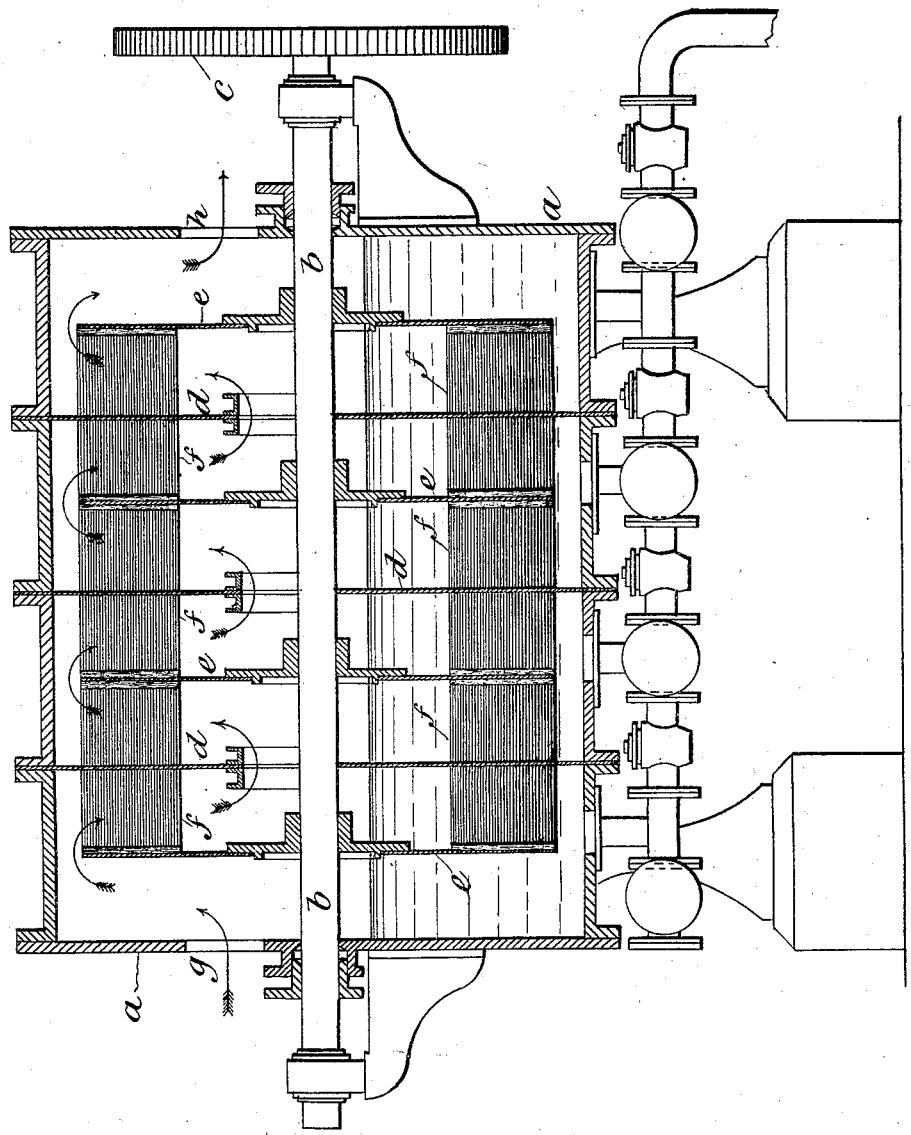

UNITED STATES PATENT OFFICE.

HARRY WOOD SMITH, OF SUTTON COLDFIELD, WILLIAM THOMAS GIDDEN, OF LANGLEY GREEN, NEAR BIRMINGHAM, AND ALFRED GORDON SALAMON, OF LONDON, ENGLAND, ASSIGNORS TO THE BRITISH CYANIDES COMPANY, LIMITED, OF OLDBURY, ENGLAND.

METHOD OF MAKING SULFOCYANIDS FROM COAL-GAS.

SPECIFICATION forming part of Letters Patent No. 705,152, dated July 22, 1902.

Application filed December 30, 1901. Serial No. 87,840. (No specimens.)

*To all whom it may concern:*

Be it known that we, HARRY WOOD SMITH, chemist, residing at Sutton Coldfield, Warwickshire, WILLIAM THOMAS GIDDEN, chemist, residing at Langley Green, near Birmingham, Warwickshire, and ALFRED GORDON SALAMON, chemist, residing at 1 Fenchurch avenue, in the city of London, England, subjects of the King of Great Britain, have invented a certain new and useful Improvement in the Manufacture of Ammonium Sulfocyanid from Coal-Gas, of which the following is a specification.

It is known that ammonium sulfocyanid is obtained in the purification of crude coal-gas; but hitherto this fact has had little commercial importance, because the sulfocyanid has been in a weak solution (usually containing only, say, one to five grams per liter) contaminated with the other impurities of the gas, so that it has been difficult and costly to separate it in a useful form. It is also known that hydrocyanic acid combines with yellow or so-called "poly-sulfid" of ammonium and forms ammonium sulfocyanid.

The object of this invention is to carry out this reaction in a convenient and economical manner, whereby we are able to obtain a strong solution of sulfocyanid of ammonium, containing, for example, two hundred grams or more of this salt to a liter, and also to remove the whole or nearly the whole of the cyanogen compounds present in the gas. For this purpose we pass the crude coal-gas after condensation of the tar and cooling through a scrubber containing free sulfur, preferably in a powdered form, and water or ammoniacal liquor. The water or liquor employed rapidly becomes charged with ammonia and then ceases to absorb it, except in the form of ammonium sulfocyanid. In this scrubber, however, some of the ammonia and sulfureted hydrogen are extracted from the gas and combine with the free sulfur to form a yellow solution of so-called "poly-sulfid of ammonium," which in contact with any hydrocyanic acid in the gas forms ammonium sulfocyanid. This process is continued with the same liquor until a sufficiently-strong solution of sulfocyanid, containing, say, two hundred grams per liter, has been obtained, and the solution is then drawn off. Preferably the process is carried on continuously, as hereinafter described, the strong solution being drawn off at one end of the scrubber and water or ammoniacal liquor being added at the other end. The strong solution of sulfocyanid thus obtained is heated in a suitable still to drive off and recover the uncombined or volatile ammonia, and is then allowed to settle or is filtered to remove any tar or solid impurities, and is then sufficiently pure for commercial use or for conversion by well-known means into sulfocyanids of other bases. The gas passing out of the scrubber still contains the greater part of its ammonia, for the essential feature of this invention is that a comparatively small quantity of water is used in this scrubber, this quantity of water being sufficient only to absorb a small proportion of the ammonia of the crude gas passed through. The gas is therefore taken to another scrubber, (or to another compartment of the same scrubber,) in which the ammonia is washed out by means of a much larger quantity of water. The gas is subsequently purified in the ordinary manner.

The drawing is a vertical section of the scrubber we prefer to employ. This scrubber is of a well-known type, and no claim is made to it.

$a$ is a fixed cylindrical casing.

$b$ is a central shaft in the casing, having fixed to it a toothed wheel $c$, driven by any convenient gearing.

$d\ d$ are partitions fixed in the casing, having in them central holes for the passage of the gas.

$e\ e$ are partitions fixed to the shaft $b$.

$ff$ are brushes formed of tufts of bass fixed to the partitions $e$ and extending to and rubbing against the partitions $d$.

$g$ is the inlet, and $h$ the outlet, for the gas, its course through the scrubber being shown by the arrows.

Water or ammoniacal liquor to about the height shown, together with pounded sulfur, are put into each of the compartments, about one hundred grams per liter being a suitable quantity, the shaft *b* is rotated, and the gas passed through. When tests show that the solution of sulfocyanid in the first or left-hand compartment is strong enough, it is drawn off and a corresponding quantity of water or ammoniacal liquor is introduced into the last or right-hand compartment, and so on. Fresh supplies of sulfur are put into the various compartments from time to time as it is used up. A similar scrubber containing water only may be used for absorbing the ammonia, the quantity of water it is necessary to pass through this scrubber being much greater than that used in the other.

What we claim is—

1. The manufacture of ammonium sulfocyanid from coal-gas containing ammonia and cyanid compounds by washing the gas with water in the presence of sulfur and continuing the process with the same water after the said water has become fully saturated with ammonia.

2. The process consisting in scrubbing coal-gas containing ammonia and cyanogen compounds with water in the presence of sulfur to obtain a solution of ammonium sulfocyanid and then again scrubbing the gas which has been so treated with a much larger quantity of water to absorb the ammonia.

3. The process consisting in scrubbing with water coal-gas containing ammonia and cyanid compounds successively in a number of scrubbers containing sulfur and again scrubbing the gas leaving the last scrubber of the series with a much larger quantity of water to absorb the ammonia, drawing off strong solution of ammonium sulfocyanid from time to time from the first scrubber simultaneously transferring liquor from each of the other scrubbers to the scrubber next before it and adding water to the last scrubber.

4. The process consisting in scrubbing coal-gas containing ammonia and cyanogen compounds with water having ammonia in solution in the presence of sulfur to obtain a solution of ammonium sulfocyanid and then again scrubbing the gas which has been so treated with a much larger quantity of water to absorb the ammonia.

HARRY WOOD SMITH.
WILLIAM THOMAS GIDDEN.
ALFRED GORDON SALAMON.

Witnesses to the signatures of the said HARRY WOOD SMITH and WILLIAM THOMAS GIDDEN:
HUME C. PINSENT,
WALTER BARROW.

Witnesses to the signature of ALFRED GORDON SALAMON:
HORACE BEARD,
ERNEST MURRAY GOLDIE.